US006954857B2

(12) United States Patent
Pelly et al.

(10) Patent No.: US 6,954,857 B2
(45) Date of Patent: Oct. 11, 2005

(54) METHOD AND APPARATUS FOR DETECTING DATA

(75) Inventors: Jason Charles Pelly, Reading (GB); Daniel Tapson, Basingstoke (GB)

(73) Assignee: Sony United Kingdom Limited, Weybridge (GB)

(*) Notice: Subject to any disclaimer, the term of this patent is extended or adjusted under 35 U.S.C. 154(b) by 315 days.

(21) Appl. No.: 10/174,552

(22) Filed: Jun. 17, 2002

(65) Prior Publication Data
US 2003/0009674 A1 Jan. 9, 2003

(30) Foreign Application Priority Data
Jun. 19, 2001 (GB) .............................. 0114927

(51) Int. Cl.⁷ .............................. H04L 9/00; G06K 9/36
(52) U.S. Cl. ...................... 713/176; 382/100; 382/232; 705/57
(58) Field of Search .......................... 713/176; 382/100, 382/232; 380/201, 210; 705/51, 57; 725/9, 22, 25

(56) References Cited

U.S. PATENT DOCUMENTS

| | | | | |
|---|---|---|---|---|
| 6,360,000 B1 | * | 3/2002 | Collier ........................ | 382/100 |
| 6,438,252 B2 | * | 8/2002 | Miller ......................... | 382/100 |
| 6,522,766 B1 | * | 2/2003 | Ratnakar ..................... | 382/100 |
| 6,556,679 B1 | * | 4/2003 | Kato et al. .................. | 380/203 |
| 6,563,935 B1 | * | 5/2003 | Echizen et al. ............. | 382/100 |
| 6,614,914 B1 | * | 9/2003 | Rhoads et al. .............. | 382/100 |

(Continued)

FOREIGN PATENT DOCUMENTS

| | | | | |
|---|---|---|---|---|
| GB | 2335816 A | * | 9/1999 | ............ H04N/1/32 |
| WO | WO 99 12347 | | 3/1999 | |
| WO | WO 9945705 A2 | * | 9/1999 | .......... H04N/1/387 |

OTHER PUBLICATIONS

Linnartz J–P M G et al: "Analysis of the Sensitivity Attack Against Electronic Atermarks in Images" Information Hiding. International Workshop Proceedings, 1998, pp. 258–272, XP000953807.

(Continued)

Primary Examiner—Andrew Caldwell
Assistant Examiner—Zachary A. Davis
(74) Attorney, Agent, or Firm—Frommer Lawrence & Haug LLP; William S. Frommer; Darren M. Simon

(57) ABSTRACT

A system for facilitating copyright protection of material includes an apparatus for detecting the presence or absence of a block of data, which may have been embedded repeatedly a predetermined number of times in the material. The presence or absence of the data block is detected from data representative of versions of the data block recovered from the material. The apparatus comprises an accumulator operable to combine the value of the bit at each corresponding position within each recovered version of the data block to generate for each bit an accumulated score. A detection processor is operable to compare the value of the accumulated scores for the bits of the block with at least one threshold, and from the comparison determine a total number of detected bits of the data block. The detection processor declares the data block as being present or absent in dependence upon the total number of detected bits. For example, the detection processor may compare the determined total number of detected bits with a threshold determined with respect to the total number of bits in the data block. If the determined number of detected bits is greater than the threshold, the detection processor determines that the data block has been detected, and otherwise determines the data block as being absent. Accordingly, the copyright protection system is provided with an improvement by reducing a probability of falsely detecting a data block as being present when it is not, and reducing a probability of not detecting a data block which has been embedded in the material. Furthermore, the system does not require knowledge of the content of the embedded data, to determine whether or not the data has been embedded in the material.

27 Claims, 5 Drawing Sheets

U.S. PATENT DOCUMENTS 6,731,774 B1 * 5/2004 Hosaka et al. .............. 382/100
6,785,398 B1 * 8/2004 Shimizu et al. ............. 382/100
2001/0026616 A1 * 10/2001 Tanaka ....................... 380/202

OTHER PUBLICATIONS

Kalker T et al: "Analysis of Watermark Detection Using SPOMF" Proceedings 1999 International Conference on Image Processing. ICIP'99. Kobe, Japan, Oct. 24–28, 1999, International Conference on Image Processing, Los Alamitos, CA: IEEE, US, vol. VOL. 1 of 4, 1999, pp. 316–319, XP000974746 ISBN: 0-7803-5468-0.

Langelaar G C et al: "Watermarking Digital Image and Video Data" IEEE Signal Processing Magazine, IEEE Inc. New York, US, vol. 17, No. 5, Sep. 2000 (2000-09), pp. 20–46, XP000992265 ISSN: 1053–5888.

* cited by examiner

|  | FALSE POSITIVE | FALSE NEGATIVE | ERROR IN DECODED PAYLOAD (FOR A DETECTED WATERMARK) |
|---|---|---|---|
| EBU REQUIREMENT[1] | $1.0 \times 10^{-8}$ | $5.0 \times 10^{-2}$ | $1.0 \times 10^{-8}$ |
| $p$ FIXED AT $0.61$[2] | $1.4 \times 10^{-14}$ | $1.9 \times 10^{-3}$ | $4.8 \times 10^{-9}$ |

FIG. 7

|  | FALSE POSITIVE | FALSE NEGATIVE | ERROR IN DECODED PAYLOAD (FOR A DETECTED WATERMARK) |
|---|---|---|---|
| LOW-PASS FILTER[3] | $1.4 \times 10^{-14}$ | $4.1 \times 10^{-5}$ | $5.9 \times 10^{-11}$ |
| JPEG[3] (20% QUALITY) | $1.4 \times 10^{-14}$ | $3.1 \times 10^{-5}$ | $4.5 \times 10^{-11}$ |
| JPEG2000[3] (10 Mbps) | $1.4 \times 10^{-14}$ | $3.1 \times 10^{-5}$ | $4.5 \times 10^{-11}$ |
| JPEG2000[3] (7.5 Mbps) | $1.4 \times 10^{-14}$ | $1.9 \times 10^{-3}$ | $2.3 \times 10^{-3}$ |
| JPEG2000[3] (5 Mbps) | $1.4 \times 10^{-14}$ | $8.6 \times 10^{-2}$ | $3.2 \times 10^{-2}$ |
| MPEG-2[3] (5 Mbps) | $1.4 \times 10^{-14}$ | $2.5 \times 10^{-2}$ | $1.9 \times 10^{-3}$ |

FIG. 8

METHOD AND APPARATUS FOR DETECTING DATA

FIELD OF INVENTION

The present invention relates to methods and apparatus for detecting the presence or absence of a block of data which may have been embedded repeatedly in material. Correspondingly, the present invention also relates to data embedding apparatus and methods for embedding data in material.

BACKGROUND OF INVENTION

Material as used herein refers to and includes any form of information material such as, for example, video material, audio material and material for conveying data.

A watermark is a term generally used to describe data or information, which has been embedded in material in some way. A watermark may be imperceptible or perceptible in the material.

A watermark may be used for various purposes. It is known to use watermarks for the purpose of protecting the material against, or trace, infringement of the intellectual property rights of the owner(s) of the material. For example, a watermark may identify the owner of the material. The owner is thereby provided with a facility for proving unauthorised copying of the material. A system for introducing and detecting a watermark embedded in material can therefore provide a facility for copyright protection, so that the copyright in the material can be asserted.

There are generally three statistics which are used to measure the performance of copyright protection systems. These are:

1. False positive: This is the probability of deciding that a part of the material is watermarked, even though it is actually un-watermarked. For video material the European Broadcasting Union (EBU) requires the probability of a false positive to be at most $10^{-8}$.

2. False negative: This is the probability of deciding that a part of the material is not watermarked, even though it is actually watermarked. The EBU requires the probability of a false negative to be at most 0.05.

3. Error free payload: This is the probability of finishing with an error free payload (after error-correction) if the watermark has been detected. The EBU requires the probability of having errors in the decoded payload to be at most $10^{-8}$.

International patent application number WO 99/12347 discloses an apparatus for detecting a watermark embedded in material. The apparatus is provided with a copy of the watermark to be detected. The apparatus correlates the copy of the watermark with respect to data recovered from the material. From the correlation the watermark is declared as being present or absent.

SUMMARY OF INVENTION

According to the present invention there is provided an apparatus for detecting the presence or absence of a data block of data bits, which may have been embedded repeatedly a predetermined number of times in material, the presence or absence of said data block being detected from data representative of versions of the data block recovered from said material, the apparatus comprising an accumulator operable to combine the value of the bit at each corresponding position within each recovered version of the data block to generate for each bit an accumulated score, and a detection processor operable to compare the value of the accumulated scores for the bits of the block with at least one threshold, and from the comparison to determine whether each of the bits of the block has been detected, and to declare the data block as being present or absent in dependence upon a total number of detected bits.

Embodiments of the present invention can provide an improvement in the likelihood of false detection and the false negative detection. The improvement can be provided to a watermarking system without adaptation of the system or at least requiring only a minimum adaptation of the system. Embodiments of the invention can be used, to provide an improvement in copyright protection. The copyright protection is generally performed at a higher level to the watermarking system, so that by providing an additional copyright protection layer on top of an existing watermarking layer, copyright protection of material can be facilitated.

The present invention utilises a probability distribution of the value of each bit of the data block, which has been embedded repeatedly in material. By adding the value of the same bit in each version of the data block recovered from the material, an accumulated score is formed for each bit. In one embodiment the accumulated score is compared with two threshold values, which define three regions for possible accumulated scores between zero and a maximum corresponding to the predetermined number of times the same data block has been embedded in the material. The first region, below a first of the thresholds, defines values, which are associated with the bit being detected as a zero. The second region formed between the value of the two thresholds defines values for which the bit is declared as not being detected. The third region, above a second of the two thresholds defines values which are associated with the bit being detected as a one. The detection processor then determines how many of the bits in the data block have been detected as zeros or ones. By comparing the number of detected bits of the block with a third threshold, a data block can be declared as being present in or absent from the material.

Comparing an accumulated score for each bit with respect to, for example, first and second thresholds to determine whether or not this bit has been detected, in combination with comparing the number of detected bits of the block with respect to a third threshold, forms a two-stage detection process. The two-stage process has been found to provide improved false positive and false negative detection probabilities, which addresses the EBU requirements indicated above.

Furthermore an advantage is provided because the detection process does not require knowledge of the content of the embedded data. Unlike the watermark detection system disclosed in WO 99/12347 referred to above, a detector for the watermark does not require a priori knowledge of the watermark to determine the presence or absence of the watermark.

As will be appreciated an aspect of the present invention provides a data embedding apparatus for embedding data in material to the effect that the presence or absence of the data can be detected. The data embedding apparatus comprises a data formatter for arranging the data into at least one data block, and a unit repeating processor operable to receive the material and to identify units of the material. In combination with the embedding processor, the repeating processor embeds the data block repeatedly in each of the units for a plurality of the units in accordance with a predetermined number of times the data block is repeatedly embedded.

In preferred embodiments, the embedding apparatus includes a shuffling processor coupled to the data formatter and to the unit repeating processor and operable to shuffle the order of the bits of the block to be embedded in the material. Shuffling the bits of the data block has the effect of ensuring the statistical independence of the decoded versions of each payload bit. This provides an advantage to the copyright protection layer, because the independence of the decoded versions of the payload bits reduces the likelihood of the payload being incorrectly detected as being present. Shuffling also provides an advantage of reducing the likelihood of fixed pattern noise, which may be induced as a result of embedding the data.

In order to meet the EBU requirements for providing as far as possible an error free payload (or at least a payload having a small number of errors), the embedding apparatus may include an error correction encoder. The error correction encoder may be coupled to the data formatter and operable to encode the data formed by the data formatter to produce an error correction encoded data block before the data block is embedded in the material.

As will be appreciated, correspondingly the apparatus for detecting the presence or absence of the data block may include a de-shuffling processor operable to change the order of the bits of the data blocks recovered from each unit to the effect of reversing the order of the predetermined shuffling pattern. The apparatus for detecting the data block may also include an error correction decoding processor.

In some embodiments the material may be video material and the units may be image frames represented by the video material. The data block may be formed from meta data describing the content of the material such as, for example, a Universal Material Identifier or the like. In other embodiments the data block may be an owner unique or at least specific identifier.

According to a further aspect of the present invention there is provided a copyright protection system for detecting the presence or absence of data embedded in material, the system comprising a de-embedding processor operable to recover data representative of each version of the data block from the material, and an apparatus for detecting the data block from the recovered versions as claimed in claims 1 to 12.

In some circumstances, data which has not been embedded in material may be falsely recovered as an all zeros or all ones sequence. In preferred embodiments, in order to address a technical problem of correctly detecting an all zeros or all ones sequence as not present in material, the data to be embedded may be combined with a Pseudo Random Bit Sequence (PRBS), or part thereof, before the data is embedded. To remove the effect of the PRBS, in preferred embodiments, the de-embedding processor may be operable to combine the data representative of the recovered versions of the data block with the predetermined PRBS to the effect of recovering the versions of the data blocks. For example the combination of the data with the PRBS may be provided by logically XOR-ing the data and the PRBS. Therefore combining the recovered data again with the PRBS will remove the effect of the PRBS from the embedded data.

Data recovered from the material which would cause the detection processor to indicate falsely that the data was embedded as an all ones or zeros sequence will appear as random data according to the PRBS and so will have a reduced likelihood of being falsely detected.

Various further aspects and features of the present invention are defined in the appended claims.

BRIEF DESCRIPTION OF THE DRAWINGS

Embodiments of the present invention will now be described by way of example only with reference to the accompanying drawings wherein:

FIG. 7 is a table providing the false positive, false negative and errors in the decoded payload for the copyright protection system according to the example embodiment in comparison to the EBU requirements; and FIG. 8 is a table illustrating the relative performance of the copyright protection system according to the example embodiment of the invention after the material has undergone different forms of compression.

DESCRIPTION OF PREFERRED EMBODIMENTS

Although it will be appreciated that the material could be audio material, video material, audio/video material or data in any form, in the example embodiment which will now be described, the material is video material. In the following description it will be assumed that a watermark is formed in video material which comprises a plurality of frames. However, it will be appreciated that this is just an illustrative example and that the data may be embedded in accordance with any unit of the video material, such as for example a field of the video material.

Figure 1:
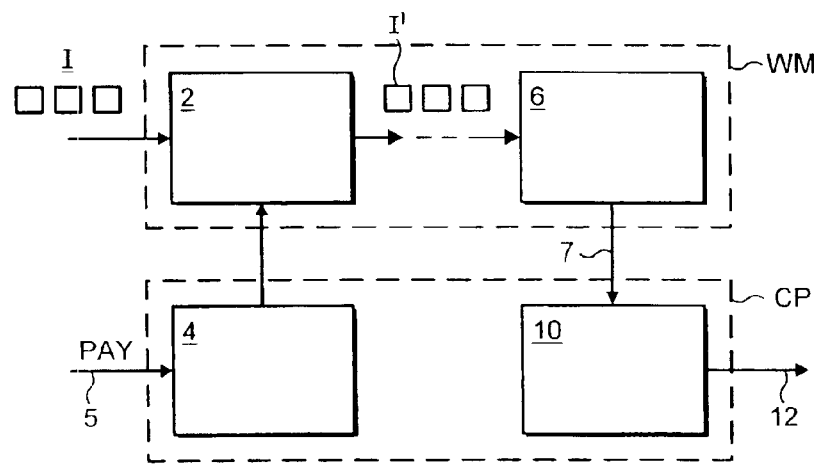
FIG. 1 is a schematic block diagram of a copyright protection system according to an example embodiment of the present invention.

FIG. 1 provides a general representation illustrating a process in which data is embedded into video material. The video material is divided into image frames I. The data embedded into these image frames I forms a watermark. The data is embedded by a watermarking layer WM. As shown in FIG. 1, a copyright protection processing layer CP provides a facility for forming a payload of data into a watermark for embedding into material and for detecting whether the payload data has been embedded in the material. An improvement in the probability of false positive and false negative detection is provided by the copyright protection processing layer CP.

As shown in FIG. 1, the image frames I are received within the watermarking layer WM by a data embedder 2. The data embedder 2 is operable to embed data received from an encoding processor 4 from the copyright protection layer CP. Embedding may be performed in various ways. One example arrangement for embedding data is disclosed in our co-pending patent application serial number 0029854.7 and UK patent application serial number 0029856.2. In these co-pending patent applications, a watermarking system for embedding data in material is disclosed. The data is embedded by modulating a pseudo random bit sequence and adding the modulated bit sequence to a transform domain version of the data.

The encoding processor 4 is arranged to process the data to be embedded within the images I in order to effect the improvement in the false positive and false negative detection probabilities. The data embedder 2 produces watermarked images I' which are then further processed. The further processing might be for example that the watermarked images are communicated, recorded, broadcast or reproduced in some way.

In order to recover the data from the watermarked images I', a data de-embedder 6 is provided which is arranged to recover the data from the image. The embedded data recovered from the image is then fed to the decoding processor 10, via a connecting channel 7, which processes the recovered data in order to improve the false positive and false negative detection probabilities. The encoding processor 4 which forms part of the copyright processing layer CP is illustrated in FIG. 2 where parts also appearing in FIG. 1 have the same numerical references.

Figure 2:
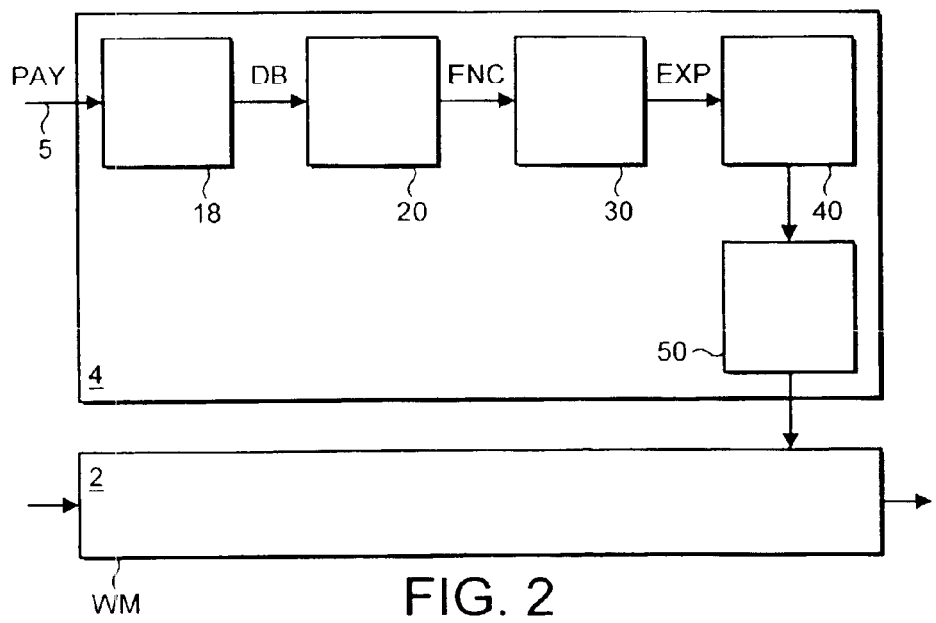
FIG. 2 is a schematic block diagram of the copyright protection system of FIG. 1, showing the data embedding processor which appears in FIG. 1 in more detail.

In FIG. 2 the encoding processor 4 comprises a data formatter 18 for forming the data blocks DB of the payload PAY and an error correction encoder 20 which is operable to encode data received from the data input channel 5 in accordance with an error correction code. For the illustrative example embodiment the encoder operates to encode 64 bits of data which are referred to in the following description as the pay load. The pay load could be for example part of an UMID or other types of meta data which describe the content of the video material. In other embodiments the pay load could represent an identifier specific to the copyright owner or provider. This identifier can therefore be used by the owner or provider to conform ownership and prove copying of the video material.

In accordance with the example embodiment the encoder 20 operates to encode the data using a BCH code to generate 127 error correction bits from the 64 payload bits, which can correct up to 10 bits.

Figure 3:
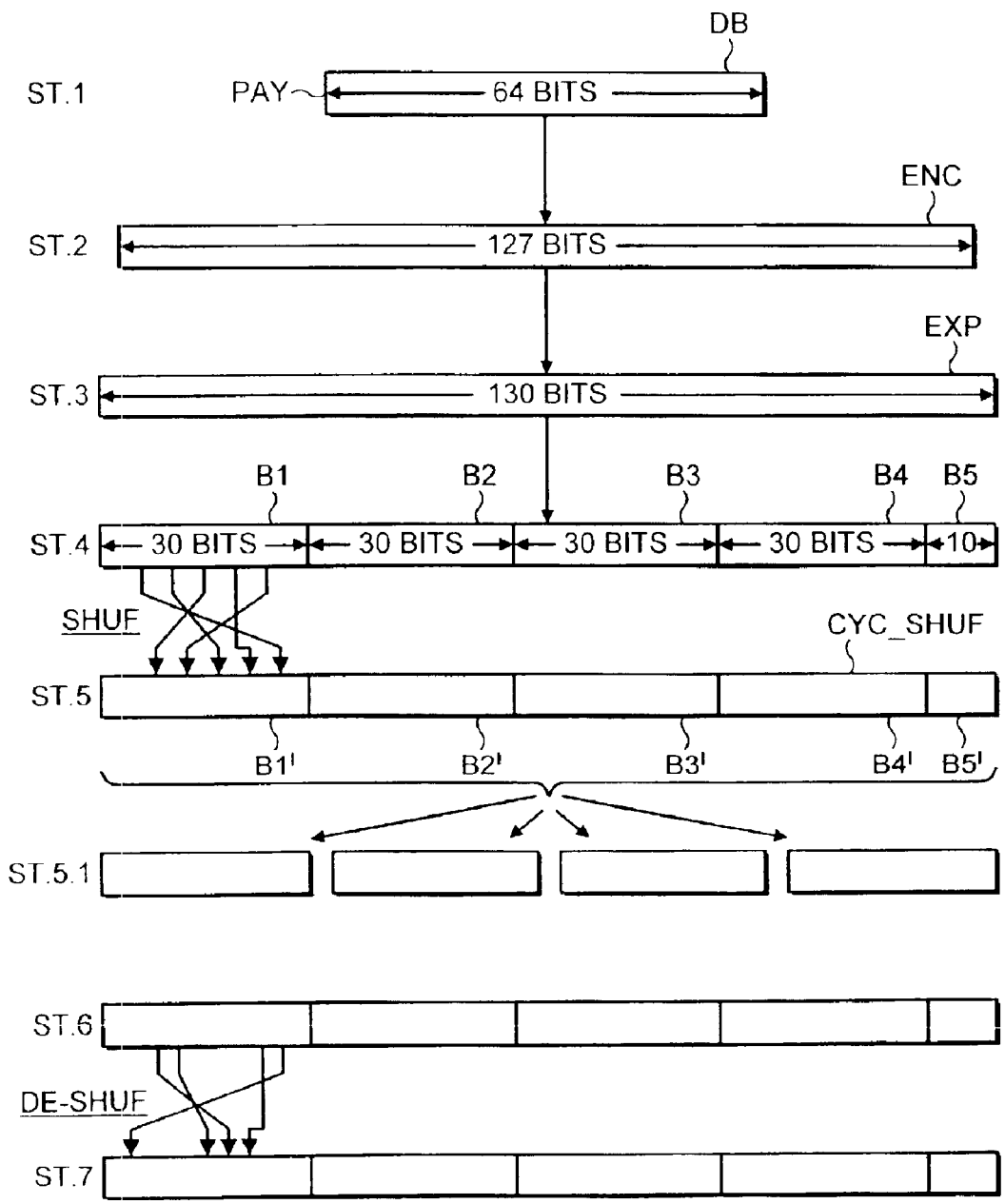
FIG. 3 provides seven schematic representation of the versions of the data block at different stages ST.1, ST.2, ST.3, ST.4, ST.5, ST.5.1, ST.6, ST.7 as produced by the data embedding processor and the data detecting processor.

Processing performed by the encoding data processor 4 is illustrated by diagrams labelled ST.1, ST.2, ST.3, ST.4, ST.5, ST.5.1, ST.6 and ST.7 in FIG. 3. Each of the diagrams ST.1, ST.2, ST.3, ST.4, ST.5, ST.5.1, ST.6 and ST.7 represents a form of the 64-bit pay load after processing performed by parts of the encoding processor 4 and the decoding processor 10.

The payload of 64-bits PAY are represented in diagram ST.1 in FIG. 3. The 64-bit payload is received by the encoder 20 of FIG. 2 and encoded using the BCH code. The encoded bits produced by the encoder 20, presented at the output of the encoder 20, are represented in diagram ST.2 in FIG. 3 as 127 error correction encoded bits ENC. The error correction encoded bits ENC are fed to a data expander 30 which adds extra bits to the encoded data word to produce 130 bits as formed at an output of the expander 30. The data word at the output of the expander EXP is represented as diagram ST.3.

The 130 bits EXP from the output of the expander 30 are then fed to a cyclic shuffling processor 40. The cyclic shuffling processor 40 divides the 130 expanded bits into four blocks of 30 bits and one of 10 bits. Correspondingly this is represented at a first step as diagram ST.4 in FIG. 3 as the data blocks B1, B2, B3, B4, B5.

The cyclic shuffling processor 40 is operable to shuffle the bits within each block B1, B2, B3, B4, B5 of the processed bits represented in diagram ST.4 in FIG. 3. The shuffling processor 40 shuffles the bits within each block B1, B2, B3, B4, B5 in accordance with a predetermined pattern which repeats cyclically after a predetermined number of frames.

For the present example embodiment it is assumed that the copyright protection processing and embedding is performed on a cycle of 30 frames. As such, the same data is embedded into each of the 30 frames as will be explained shortly. Accordingly, each of the blocks of 30 bits and 10 bits is shuffled so that in each frame the bits are in a different positions. The shuffling is represented as lines SHUF between the un-shuffled blocks B1, B2, B3, B4, B5 of diagram ST.4 and the shuffled blocks B1', B2', B3', B4', B5' of diagram ST.5. Shuffling the bits of the data block has the effect of ensuring the statistical independence of the decoded versions of each payload bit. This provides an advantage to the copyright protection layer, because the independence of the decoded versions of the payload bits reduces the likelihood of the payload being incorrectly detected as being present. Shuffling also provides an advantage of reducing the likelihood of fixed pattern noise, which may be induced as a result of embedding the data.

After the 130 bits have been shuffled by the cyclic shuffling processor 40 the bits are received at a frame processor 50. The frame processor 50 operates to generate replicas of each of the shuffled data blocks CYC_SHUF for repeated embedding of each data block into each frame. For the present example embodiment, the same shuffled data block CYC_SHUF is embedded four times into each frame. The frame processor 50 therefore serves to generate four replicas of the data block for repeated embedding in each frame.

In the present example embodiment the 130-bit block is divided into sub-blocks. The block of shuffled bits CYC_SHUF comprising the shuffled sub-blocks B1', B2', B3', B4', B5' are embedded four times into each frame as represented by step ST.5.1. Furthermore, as indicated each shuffled block is embedded both repeatedly within a frame and repeatedly in a different shuffled form throughout a number of frames. For the illustrative embodiment the number of frames in which the same shuffled data blocks B1', B2', B3', B4', B5' are repeated is thirty although it will be understood that any number of frames could be used. To provide a better understanding of the present invention it is assumed that the 130 encoded and shuffled pay load bits are simply repeated four times in each frame, for each of 30 frames.

Returning to FIG. 1 the embedded data is recovered from the watermarked image data I' by the data de-embedder 6. The de-embedder 6 recovers versions of the data blocks from the image data I'. The recovered data blocks are fed to the decoding processor 10, via the connecting channel 7. The decoding processor 10 is shown in more detail in FIG. 4 where parts also appearing in FIG. 1 bear the same numerical designations.

Figure 4:
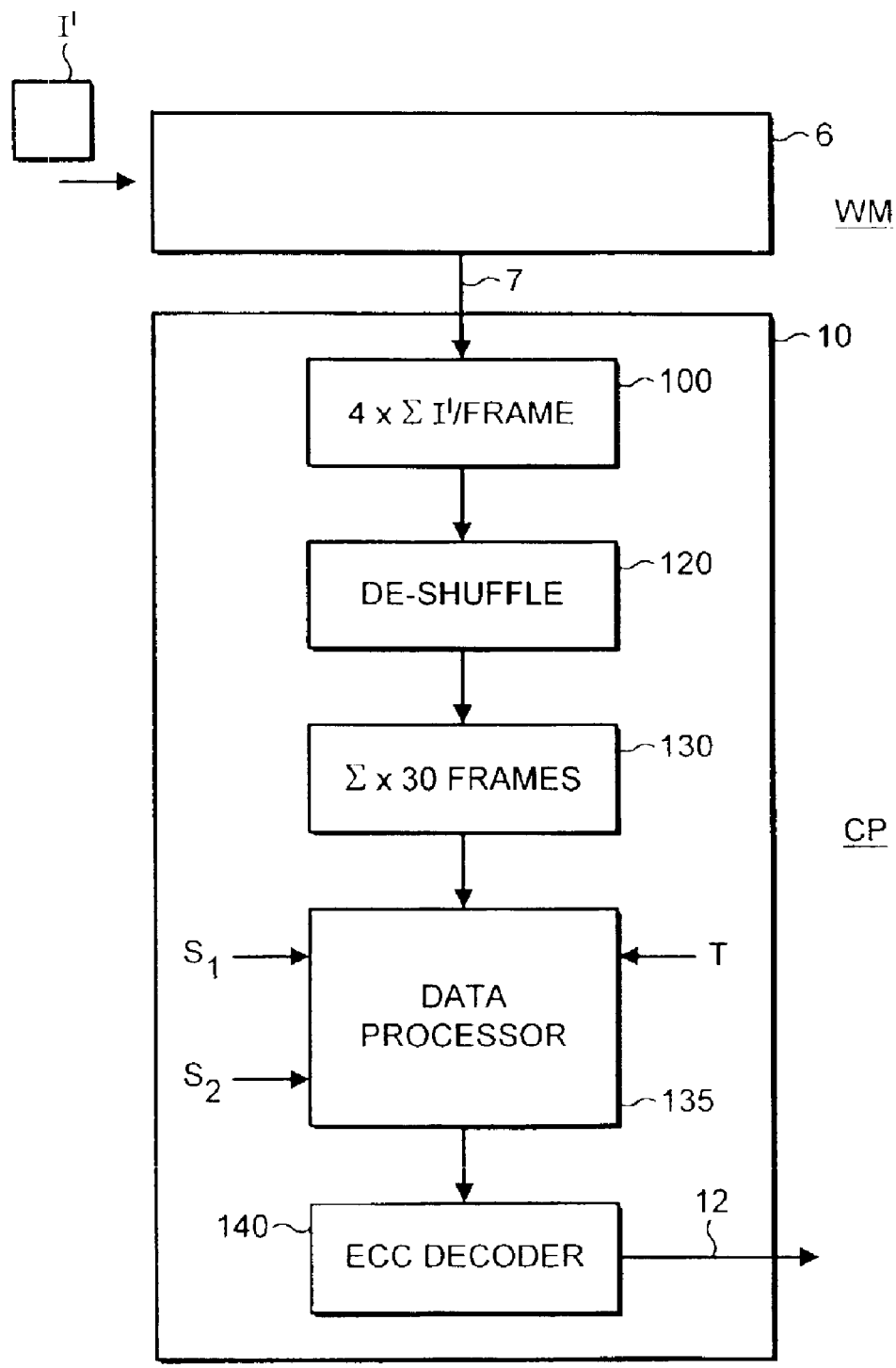
FIG. 4 is a schematic block diagram of an apparatus for detecting the presence or absence of a data block appearing in FIG. 1.

In FIG. 4 each of the image frames I' is received by the de-embedding processor 6 which recovers the data embedded in each frame. The data which has been recovered from each frame is fed to a first accumulator 100 in the decoding processor 10.

The watermark de-embedding processor 6 is operable to recover each of four versions of the 130 embedded bits from each frame. The first accumulator 100 accumulates the value of the bit in each corresponding position in the 130 bit block by adding these values to form an accumulated score from the four recovered versions. This is represented in FIG. 3 by step ST.6. The accumulated data block recovered from each frame is then fed to a de-shuffling processor 120 which is operable to reverse the shuffling process performed by the shuffling processor 40 shown in FIG. 2. The effect of the de-shuffling processor 120 is to produce for each frame a de-shuffled version of the 130 bits. This is represented at step ST.7 in FIG. 3. Each version recovered from each of the thirty frames should therefore correspond with one another. Accordingly, a second accumulator 130 receives each accumulated and de-shuffled block and again combines the value of each bit in the corresponding position in each of the recovered versions of the 130 bit block by adding the bit value for each corresponding bit within the version of the block for each corresponding version recovered from each of the 30 frames.

The second accumulator 130 forms an estimate of the value of each bit within the 130 bit block by combining each of the (4×30=120) versions of the block which were embedded within the 30 frames. In combination with the first accumulator 100, the value of each bit in the block is determined by summing the value of each bit at the corresponding bit position in each of the 120 versions formed by embedding the block four times within each of 30 frames repeatedly. Effectively, therefore summing each of the bits produces a score between 0 and 120 depending on whether the value of each bit is a '0' or a '1'. Accordingly, all values between 0 and 120 are possible, with the value 60 corresponding to the case where exactly half the bits (for a given bit position in the encoded block) are 0 and a half are 1.

For each bit position in the 130-bit block, the second accumulator provides an accumulated score to a detection processor 135. The detection processor 135 receives two thresholds S1, S2 which are set to define a boundary between an accumulated bit being declared as a 1, and accumulated bit being declared as a 0. A region formed between the two thresholds S1 and S2 corresponds to a bit being declared as not being present. This is represented graphically in FIG. 5.

Figure 5:
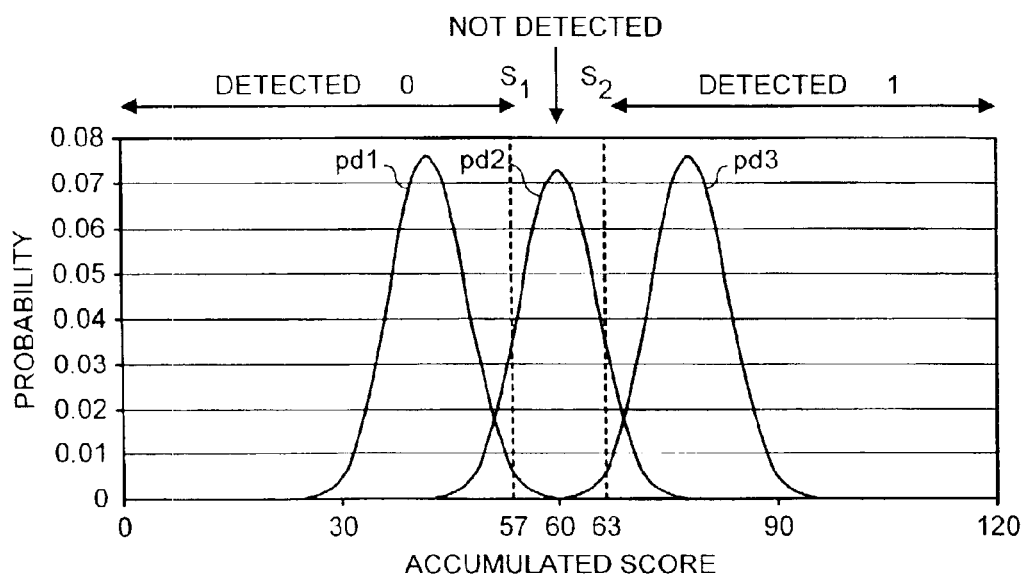
FIG. 5 provides graphical representations of the probability distributions of the accumulated score for an embedded bit being a zero, a one and detecting a bit when a bit is not present in the material, as formed by the detecting apparatus shown in FIG. 4.

In FIG. 5 a probability distribution of the accumulated score for a given bit is shown for each of three cases. The probability distribution represents the probability of correctly recovering each bit from the watermarked image. The three cases are that the embedded bit in the block is actually a '0' PD1, that no bit has actually been embedded, that is to say a probability distribution function (PDF) produced by random data PD2 and the probability distribution if the encoded bit was a "1" PD3. The thresholds S1, S2 are set so that, as far as possible, if a data bit has been embedded, then this is detected, thereby reducing the false negative detection. Similarly the thresholds S1, S2, are set to ensure that as far as possible a bit which has not been embedded is detected as not being present, thereby reducing false positive detection.

As shown in FIG. 5, the first and second thresholds ($S_1$ and $S_2$) may be set with respect to an integer variable S, which is set to a value less than N/2 (where N is the predetermined number of times a data block is repeatedly embedded—in this case 120), the first threshold being set in accordance with S, ($S_1$=S57 in this example), and the second threshold being set in accordance with N−S, ($S_{2=N-S}$63 in this example).

As will be seen from FIG. 5 an advantage of repeatedly embedding the same bit within each frame, for each of a plurality of frames, is to produce a statistical distribution for decoding 0s and 1s which are easily separable. By setting the threshold S1 and S2 accordingly, the detection processor 135 can detect the presence of a 0 or 1 or declare a bit as not being detected.

Returning to FIG. 4, the detection processor 135 is also arranged to receive a third threshold parameter T. Threshold parameter T is provided in order to determine whether or not the detection processor 135 declares that data has or has not been embedded within the video material. The detection processor 135 is arranged to count the number of 0s and 1s which have been declared as being detected. If this number is above the threshold T then it is declared that data has been embedded into the video material and that therefore this material has been watermarked. Correspondingly, if this number is below the threshold, then it is declared that data has not been detected. As will be appreciated a suitable output channel (not shown) can be provided to communicate a signal representative of this declaration. This process is represented graphically in FIG. 6.

Figure 6:
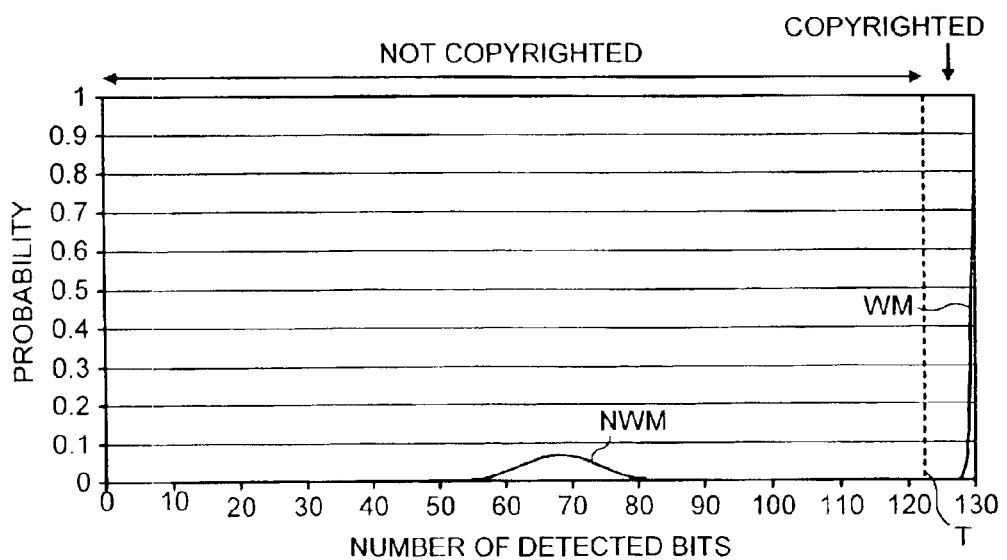
FIG. 6 provides graphical representations of the probability distributions of the number of detected bits for watermarked and not watermarked material.

As can be seen in FIG. 6 for the present example embodiment the threshold T is set so that it is above 120. Setting the threshold T at 120 provides an advantage because the number of bits declared as not being detected within the 127 bit encoded block (ignoring the expanded bits) is well within the 10 bit error correction capacity of the BCH code. The payload can therefore be recovered without these 10 bits being detected (140). As illustrated in FIG. 6, a graphical representation of a probability distribution for watermarked material exhibits a sharp peak about 127-bits, which illustrates that the copyright protection layer according to the example embodiment of the invention provides a robust false negative protection. Also shown FIG. 6 is a graphical representation of a probability distribution for a number of detected bits from material which has not been watermarked. A "hump" produced at around 65 detected bits corresponds to approximately half the bits being detected at being present at random. As will be appreciated, the low value of the probability of a number of detected bits in the range represented by the region of the "hump", and the relative separation of this range from the detection threshold T provides a robust false positive protection provided by the example embodiment.

An illustration of the effectiveness of the copyright protection process is provided by a table shown in FIG. 7. FIG. 7 provides a table of values for false positive, false negative and decoded payload errors. In a first row, the probability values set by the European Broadcasting Union (EBU) are presented. In the second row, the probability values which are produced by the example embodiment of the present invention are presented for a given probability p of 0.61 that an embedded bit is correctly recovered by the underlying watermarking layer from the material. As illustrated in FIG. 7 the probability of false positive detection, false negative detection and errors in the decoded payload for a detected watermark are all better than those required by the EBU.

FIG. 8 provides a further illustration of the relative robustness for copyright protection processing. In FIG. 8 in the first column the entries represent processing performed on the watermarked video material. These include low pass filtering, JPEG encoding at 20% quality, JPEG 2000 encoding at 10 megabits per second, JPEG 2000 encoding at 7.5 megabits per second, JPEG 2000 at 5 megabits per second and MPEG2 encoding at 5 megabits per second. In all cases except the MPEG2 encoding these results were obtained for 73 standard definition frames. For MPEG2 processed images the encoding was performed with 51 sequences each sequence consisting of 29 standard definition frames with MPEG2 encoding on the basis of a 12 frame GOP so at least some of the GOPs involved scene changes.

As will be appreciated it is important that synchronisation is maintained between the encoder and the decoder. Accordingly in some circumstances it may not be possible to determine the relative synchronisation position of the frames to which the same encoded data has been added. However, without prior knowledge of the relative synchronisation between the bits embedded by the encoder and the bits recovered by a decoder, the decoder can be arranged to detect in parallel 30 versions of the embedded data. For each of the 30 frames an offset of one frame is introduced, so that all possible combinations of successive frames are considered.

An ancillary technical problem subsists in a particular case where the decoding processor 10 of the copyright protection layer receives an image which is entirely black, and in which no data block has been embedded. For this example, the decoding processor 10 will recover data representative of versions of the data blocks, which may contain all zeros. This will have the effect that the accumulated score formed by the second accumulator 130 will indicate a value of "0", which will be determined with respect to the first detection $S_1$ threshold as being a "0", with high confidence. As a result the detection processor will erroneously determine that 130 bits have been detected and indicate correspondingly that the data block representing a watermark is present.

In order to address this technical problem, the data embedder 2 is arranged to form a logical XOR combination of the versions of the data blocks to be embedded with a Pseudo Random Bit Sequence (PRBS). As those skilled in the art will know, the XOR combination is formed by XOR-ing each bit of the data block with a corresponding bit of the PRBS. By repeating the XOR combination of the versions of the data block recovered from the material at the de-embedding processor 6, the effect of the PRBS will be removed from the recovered embedded data. However, if no data block has been embedded then the XOR combination at the de-embedder will have an effect of generating random data, which will produce an accumulated score falling between the first and second detection thresholds $S_1$, $S_2$. The detection processor 135 will therefore correctly detect that no data block has been embedded in the material. In particular, an all zeros sequence, which may be recovered from a black image, will produce a random sequence according to the PRBS with which the sequence is combined at the de-embedding processor. The detection processor 135 will correctly determine that no embedded data block has been embedded.

Although the example embodiment has been described as embedding the 130 coded bits within the same frame by repeating this four times within a frame, in other embodiments the encoded data block may not be repeated but may be embedded using a spreading code having a greater length. As disclosed in our co-pending patent application number 0029854.7 and UK patent application number 0029856.2, each bit of data to be embedded within a frame may be arranged to modulate a pseudo random bit sequence. This modulated bit sequence is added to an image frame in the wavelet transform domain. Accordingly, by using a longer spreading code, each bit of the 130 bit block to be embedded may be arranged to modulate the longer spreading code. The longer spreading code therefore has the effect of utilising four times the capacity which would be used if the data block were to be embedded only once.

Various modification may be made to the embodiments herein before described without departing from the scope of the present invention. Although the encoded data blocks have been added repeatedly to each of a plurality of frames of video material, it will be appreciated that in other embodiments data can be added repeatedly on the basis of other units which may or may not depend on the type of data. Although in the example embodiment the copyright protection layer includes an error correction encoder and decoder, it will be appreciated that in other embodiments the data blocks may not be error correction encoded. Similarly, in some embodiments the process of shuffling the data bits within the block embedded into the frame or other data unit may not be applied.

What is claimed is:

1. An apparatus for detecting the presence or absence of a data block of data bits, which may have been embedded repeatedly a predetermined number of times in material, the presence or absence of said data block being detected from data representative of versions of said data block recovered from said material, said apparatus comprising an accumulator operable to combine the value of the bit at each corresponding position within each recovered version of said data block to generate for each bit an accumulated score, and a detection processor operable to compare the value of the accumulated scores for the bits of the block with at least one threshold, and from said comparison to determine whether each of said bits of said block has been detected, and to declare said data block as being present or absent in dependence upon a total number of detected bits.

2. An apparatus as claimed in claim 1, wherein said detection processor is operable to compare the value of the accumulated score for each bit with first and second thresholds, said first threshold being less than said second threshold, and if said accumulated score is below said first threshold or above said second threshold declaring said bit value as being present, to determine said total number of detected bits from the total number of bits declared as being present, and to compare the determined total number of detected bits with a third threshold, and if said determined number of detected bits is greater than said third threshold determining that said data block is present, and otherwise determining that said data block is absent.

3. An apparatus as claimed in claim 2, wherein said detection processor is operable to compare the value of the accumulated score for each bit with said first and second thresholds, and if said accumulated score is below the first threshold detecting the value of the bit as a zero, or if the value of said accumulated score is greater than the second threshold detecting the value of the bit as a one, or if said accumulated score falls in a range between the first and second thresholds declaring said bit value as not being present.

4. An apparatus as claimed in claim 2, wherein said third threshold is determined with respect to the total number of bits in said data block.

5. An apparatus as claimed in claim 2, wherein said first and second thresholds are set with respect to an integer variable S, which is set to a value less than N/2, where N is said predetermined number of times said data block has been repeatedly embedded, said first threshold being set in accordance with S, and said second threshold being set in accordance with N−S.

6. An apparatus as claimed in claim 1, for use in determining copyright ownership of said material, wherein said data block is representative of information which can be identified by the owner of said material.

7. An apparatus as claimed in claim 6, wherein said data block is formed from meta data describing the content of the material and including a Universal Material Identifier.

8. An apparatus as claimed in claim 1, wherein said data block has been embedded repeatedly in a unit of said material for each of a plurality of said units, and said accumulator comprises a first accumulator operable to combine the value of each bit of each recovered version of said block from each unit to form an intermediate data block version for each unit, and a second accumulator operable to combine said intermediate data blocks for each of said plurality of units to generate for each bit of said data block said accumulated score.

9. An apparatus as claimed in claim 8, wherein the order of the bits of said versions of said data blocks which have been embedded repeatedly in said units of said material is shuffled between versions of said data blocks embedded in said units in accordance with a predetermined shuffling pattern, said apparatus comprising a de-shuffling processor coupled between said first and second accumulators and operable to change the order of the bits of said data blocks recovered from each said unit to the effect of reversing the order of said predetermined shuffling pattern.

10. An apparatus as claimed in claim 8, wherein said material is video material and said units are image frames represented by said video material.

11. An apparatus as claimed in claim 1, wherein said data block has been error correction encoded before being embedded repetitively in said material, wherein said third threshold is determined with respect to a total number of bits in said data block in combination with a number of bits that can be corrected by said error correction code.

12. An apparatus as claimed in claim 11, comprising an error correction and/or detection decoder operable to error correction decode said data block which is detected by said detection processor as being present in said material.

13. A data embedding apparatus for embedding data in material to the effect that the presence or absence of said data can be detected by the apparatus according to claim 1, said data embedding apparatus comprising a data formatter for arranging said data into at least two data blocks, a unit repeating processor operable to receive said material and to identify units of said material and in combination with said data formatter to embed each of said data blocks repeatedly in one of said units for a plurality of said units in accordance with a predetermined number of times said data block is to be repeatedly embedded; and a shuffling processor coupled to said data formatter and to said unit repeating processor and operable to shuffle the order of the bits of the versions of said block which are embedded in said material.

14. A data embedding apparatus as claimed in claim 13, said data embedding apparatus comprising an error correction encoder coupled to said data formatter and operable to encode said data formed by said data formatter to produce said data block which has been error correction encoded before said data block is embedded in said material.

15. A data embedding apparatus as claimed in claim 13, composing a data combiner operable to combine said at least one data block from said data formatter with a Pseudo Random Bit Sequence or part thereof to form at least one combined version of said data block for embedding in said material.

16. A computer program product having a computer readable medium on which there is recorded information signals representative of a computer program which when loaded onto a data processor configures the data processor to operate as the apparatus for detecting the presence or absence of a data block according to claim 1.

17. A copyright protection system for detecting the presence or absence of data embedded in material, said system comprising a de-embedding processor operable to recover data representative of each version of the data block from the material, and an apparatus for detecting the data block from said recovered versions according to claim 1.

18. A copyright system as claimed in claim 17, wherein said data blocks have been combined with a predetermined Pseudo Random Bit Sequence (PRBS) or part thereof, before being embedded repeatedly in the material, and said de-embedding processor is operable to combine the data representative of the versions of the data block with said predetermined PRBS to the effect of recovering said versions of said data blocks.

19. A method of detecting the presence or absence of a block of data from data representative of versions of said data block recovered from material in which said data block may have been embedded repeatedly a predetermined number of times, said method comprising combining the value of the bit at each corresponding position within each recovered version of said data block to generate for each bit an accumulated score, comparing the value of the accumulated score for each bit with at least one threshold, in accordance with said comparison determine the total number of detected bits, and determining whether said data block is present or absent, in dependence upon said total number of detected bits.

20. A method of embedding data in material to the effect that the presence or absence of said data can be detected by the method according to claim 19, said method comprising formatting said data into at least two data blocks, receiving said material and identifying units of said material in which said data blocks are to be embedded, shuffling the order of the bits of the versions of said blocks which are to be embedded in said material, embedding each of said data blocks repeatedly in each of said units for a plurality of said units in accordance with a predetermined number of times said data block is to be embedded.

21. A computer program product having a computer readable medium on which there is recorded information signals representative of a computer program which when loaded on to a data processor causes the data processor to perform the method according to claim 19.

22. A copyright protection apparatus for determining whether material has been copyright protected by detecting the presence or absence of a block of data bits which may have been embedded in said material a predetermined number of times, said apparatus comprising a detection processor operable to form an accumulated score for each bit of the block from recovered versions of the data block, to determine whether each data bit has been detected from the accumulated score and to determine whether the material is copyright protected from the total number of detected bits of the data block.

23. A copyright protection method for determining whether material has been copyright protected by detecting the presence or absence of a block of data bits which may have been embedded in said material a predetermined number of times, said method comprising forming an accumulated score for each bit of the block from recovered versions of the data block, determining whether each data bit has been detected from the accumulated score, and declaring the material as copyright protected from the total number of detected bits of the data block.

24. A copyright protection apparatus for detecting a block of data bits which has been repeatedly embedded a predetermined number of times in material, comprising an analysis processor operable to generate a statistical measure representative of the value of each bit, and a detection processor operable to determine the presence or absence of the data block using said statistical measure for each bit of said block.

25. A copyright protection method for detecting a block of data bits which has been repeatedly embedded a predetermined number of times in material, said method comprising generating a statistical measure representative of the value of each bit, and determining the presence or absence of the data block using said statistical measure for each bit of said block.

26. An apparatus for detecting the presence or absence of a block of data from data representative of versions of said data block recovered from material in which said data block may have been embedded repeatedly a predetermined number of times, said apparatus comprising means for combining the value of the bit at each corresponding position within each recovered version of said data block to generate for each bit an accumulated score, means for comparing the value of the accumulated score for each bit with at least one threshold, means for determining in accordance with said comparison the total number of detected bits, and means for determining whether said data block is present or absent, in dependence upon said total number of detected bits.

27. A copyright protection system operable to facilitate identification of the owner of material from data embedded in said material, said system comprising a data embedding apparatus including:

a data formatter for arranging said data into at least one data block, and a unit repeating processor operable to receive said material and to identify units of said material and in combination with said embedding processor to embed said data block repeatedly in each of said units for a plurality of said units in accordance with a predetermined number of times said data block is repeatedly embedded, and a de-embedding processor operable to recover each version of the data from the material; and an apparatus for detecting the presence or absence of a data block including:

an accumulator operable to combine the value of the bit at each corresponding position within each recovered version of said data block to generate for each bit an accumulated score, and a detection processor operable to compare the value of the accumulated scores for the bits of the block with at least one threshold, and from said comparison to determine whether each of said bits of said block has been detected, and to declare said data block being present or absent in dependence upon a total number of detected bits.

* * * * *